UNITED STATES PATENT OFFICE.

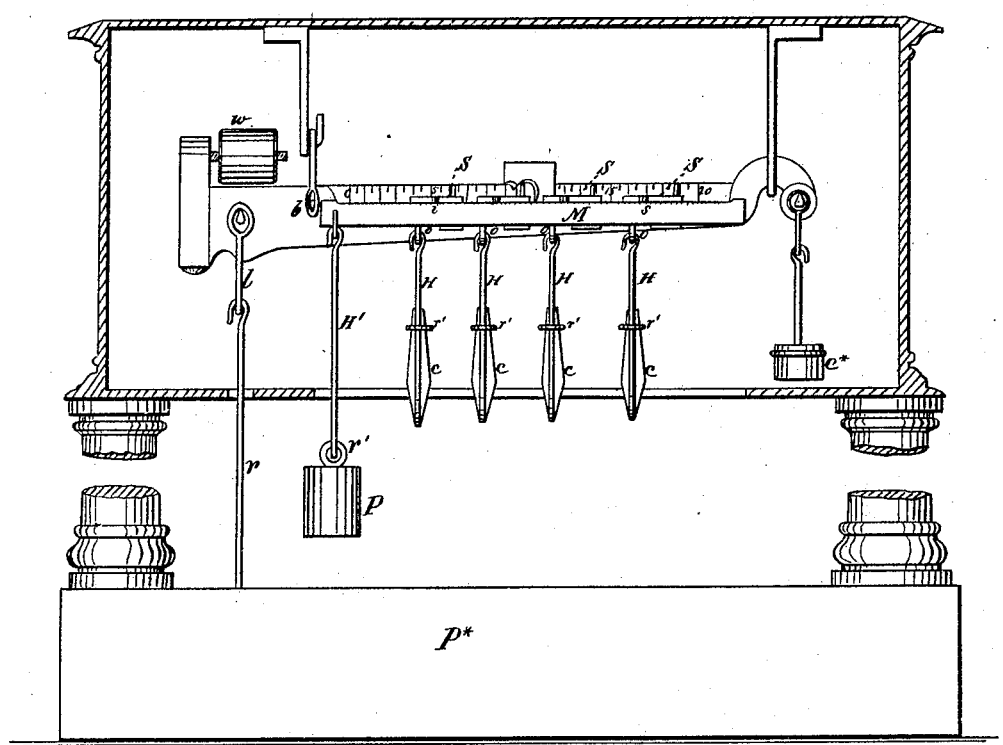
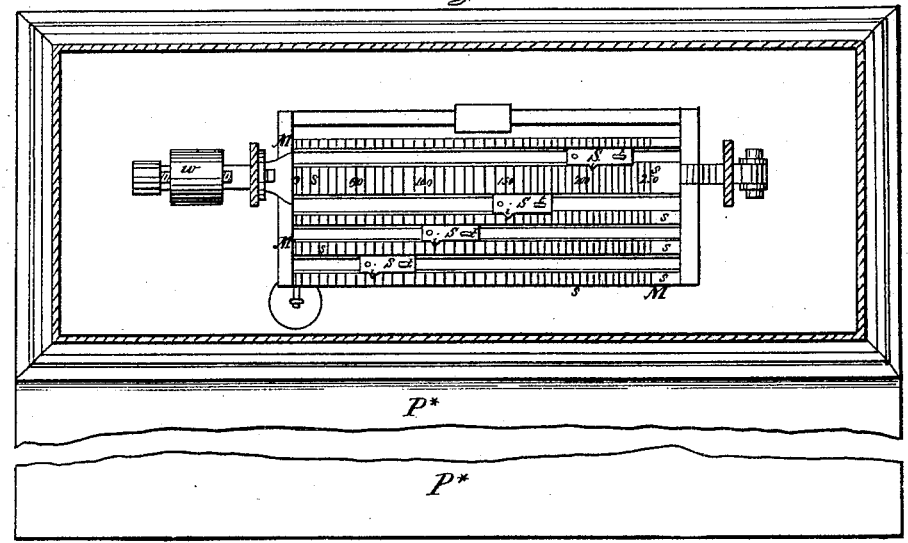
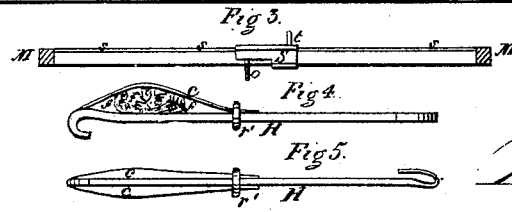

WILLIAM W. REYNOLDS, OF BRANDON, VERMONT.

IMPROVEMENT IN WEIGHING-SCALES.

Specification forming part of Letters Patent No. 170,191, dated November 23, 1875; application filed October 21, 1875.

*To all whom it may concern:*

Be it known that I, WILLIAM W. REYNOLDS, of Brandon, in the county of Rutland and State of Vermont, have invented certain Improvements in Weighing-Scales, of which the following is a specification:

This invention is more particularly intended for weighing coal, ore, flux, &c., in charging or feeding blast, smelting, melting, and other furnaces; and its object is to provide a means whereby the exact quantity of either material may be indicated to and weighed by an attendant too illiterate to accurately read either the scale of the beam or any lettered directions attached to the apparatus, and too careless or obtuse to clearly distinguish from memory alone the different weights required of the various materials.

The invention consists in the arrangement of sample-holders upon a multiplex-scale beam, whereby a laborer or attendant unable to read printed characters or directions is enabled to identify each scale of the beam with the material to the weighing of which such scale is especially devoted. The invention further comprises a novel combination of parts, whereby the most efficient operation, in conjunction with each other, of the aforesaid features of the invention, and, consequently, of the apparatus as a whole, is secured.

Figure 1 is a front view of an apparatus made according to my invention. Fig. 2 is a plan view of the same. Fig. 3 is a detached sectional view of one portion of the same, and Figs. 4 and 5 are detached views at different angles of another portion of the same.

M is the multiplex beam, pivoted upon a knife-edge bearing at $b$, furnished at one extremity with the adjustable weight $w$, at its opposite end with the counterpoise $c$, and connected, by link $l$ and rod $r$, with the usual platform P* of a platform-scale; the *modus operandi* in the mere operation of weighing with any one of the scales $s$, comprised in the multiplex beam M, hereinafter set forth, being the same as that of a common platform-scale, and, therefore, needing no particular description here. That portion of the beam M between its bearings $b$ and counterpoise $c$ is expanded laterally, and slotted lengthwise, to provide a horizontal series of parallel bars, each of which is graduated upon its upper surface, after the manner of an ordinary single-scale beam, all as shown more plainly in Fig. 2, these bars being, for convenience of description, herein designated simply as scales $s$. The spaces between the scales $s$ form longitudinal guides for adjustable slides S, each of which is provided with an index, $i$, arranged in appropriate relation with the scale. Each of the aforesaid guides is enlarged above and below by rabbets formed in the adjacent edges of the scales $s$. Each slide is divided horizontally into two parts, connected by a set or thumb screw, $t$, so that by turning the said screw the slide will be tightened, and thereby fixed to its place at any desired point along the scale. Upon the under side of each slide is a loop, $o$, formed with a knife-edge bearing, upon which is placed the suitably shaped upper end of a pendent hook, H, the lower end of which is shaped to receive the ring $r'$ of the poise P. In the preparatory balancing of the beam the poise P is suspended from a hook, H', provided at zero upon the beam M, as shown in Fig. 1. It will be seen that by placing the poise upon any one of the hooks H, the slide S of which is brought to the point upon its scale indicating the required weight, the balancing of the beam M by the weight of the material placed upon the platform P* will indicate the correct and corresponding weight of such material placed, for the time being, upon the platform. Each scale $s$, therefore, being set apart to the weighing of a certain material, and the slide S of each scale being fixed at the requisite point, it is only necessary to move the poise P from one hook, H, to another to permit each scale to be separately used without further adjustment for weighing the material for which it is especially set apart, by which means the liability to mistake which exists when varying quantities are to be weighed with an ordinary scale-beam having the usual movable poise is wholly avoided. It is necessary, however, that the particular material to which each scale $s$ is devoted should be kept in mind. To insure this each of the pendent hooks H is provided with a spring-clamp, $c$, compressed toward the stem of the hook by means of a sliding ring, $r'$. In each of these clamps $c$ is placed a sample or fragment, $f$, of the material to be weighed by the scale to which the hook is attached, as represented in Fig. 3, the liability of weighing one material upon the scale devoted to another material being by this means entirely obviated. It is manifest that any other holding device exhibiting the sample or fragment to view may be substituted for the same purpose in place of the clamp. It is essential that the hooks H work on knife-edges, in order that friction or change of leverage, which would otherwise be incurred in the operation of the apparatus, may be avoided. The multiplex beam M having each of its scales graduated with a view to indicate the weight of the material weighed exclusive of its "tare," a supplemental beam, S', answering in a certain way to a common scale-beam, is attached to or formed in one with the multiplex beam M, and provided with the movable poise P'. The average weight of the barrows, vehicles, or the like, containing the material to be weighed, being known, the poise P' is placed at a corresponding point upon the graduated edge of the supplemental beam S', and thereby balances the weight of the "tare" placed upon the platform with the material.

What I claim as my invention is—

1. The improvement in scales consisting in the arrangement upon the multiplex beam of sample-holders, substantially as and for the purpose set forth.

2. The combination of the multiplex beam, furnished with the adjustable slides, carrying the poise-holders suspended on knife-edges, the supplemental or tare beam, and the sample-holders, provided to indicate the special use of each scale of the multiplex beam, the whole arranged for joint use in the operation of the apparatus for weighing coal, ore, flux, &c., substantially as and for the purpose set forth.

WM. W. REYNOLDS.

Witnesses:
W. M. EDWARDS,
WM. B. PHAIR.